(12) United States Patent
Park (10) Patent No.: US 8,194,223 B2
(45) Date of Patent: Jun. 5, 2012

(54) DISPLAY PANEL, DISPLAY APPARATUS HAVING THE SAME, AND METHOD THEREOF

(75) Inventor: Do-Hyeon Park, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/267,129

(22) Filed: Oct. 6, 2011

(65) Prior Publication Data
US 2012/0026448 A1 Feb. 2, 2012

Related U.S. Application Data

(63) Continuation of application No. 11/931,216, filed on Oct. 31, 2007, now Pat. No. 8,064,029.

(30) Foreign Application Priority Data

Dec. 1, 2006 (KR) .......................... 10-2006-0120588

(51) Int. Cl.
*G02F 1/1345* (2006.01)

(52) U.S. Cl. ....................................................... 349/152
(58) Field of Classification Search .................. 349/149, 349/152
See application file for complete search history.

(56) References Cited

U.S. PATENT DOCUMENTS

| 7,499,141 B2 | 3/2009 | Lai |
| 2004/0135956 A1 | 7/2004 | Kim et al. |

*Primary Examiner* — Jerry Rahll
(74) *Attorney, Agent, or Firm* — Cantor Colburn LLP (57) ABSTRACT

A display panel includes a source-pad portion, a first source fan-out portion and source lines. The source-pad portion has a group of pads to which a driving signal is applied from an external source. The source fan-out portion has output lines that are extended from the group of pads and are formed to have an asymmetric structure. The source lines are extended from the output lines, and pixels of different colors are connected to each of the source lines. Accordingly, a unit pixel portion is formed to be perpendicular to each other and a fan-out portion is formed to have the asymmetric structure, so that a size of a printed circuit board is remarkably decreased. Thus, costs for manufacturing a display apparatus may be decreased.

20 Claims, 4 Drawing Sheets

DISPLAY PANEL, DISPLAY APPARATUS HAVING THE SAME, AND METHOD THEREOF

CROSS REFERENCE TO RELATED APPLICATIONS

This application is a continuation of U.S. patent application Ser. No. 11/931,216, filed on Oct. 31, 2007, which claims priority to Korean Patent Application No. 2006-120588, filed on Dec. 1, 2006, and all the benefits accruing therefrom under 35 U.S.C. §119, the contents of which in its entirety are herein incorporated by reference.

BACKGROUND OF THE INVENTION

1. Field of the Invention

The present invention relates to a display panel, a display apparatus having the display panel, and a method thereof. More particularly, the present invention relates to the display panel capable of decreasing manufacturing costs, the display apparatus having the display panel, and a method thereof.

2. Description of the Related Art

Generally, a liquid crystal display ("LCD") apparatus includes an LCD panel, a printed circuit board ("PCB") on which a driving chip driving the LCD panel is mounted, source or data tape carrier packages ("TCPs") which electrically connect the LCD panel with the PCB and a source driving chip mounted thereon, and gate TCPs on which a gate driving chip is mounted.

In order to decrease a size of the LCD apparatus and costs for manufacturing the LCD apparatus, a gate integrated circuit ("IC") less ("GIL") structure that does not have the gate TCPs and has the gate driving circuit directly mounted on the LCD panel, has been developed and used in various fields.

Accordingly, as the LCD apparatus becomes larger and less expensive, technology for decreasing the size and the manufacturing costs of the LCD apparatus is required.

BRIEF SUMMARY OF THE INVENTION

The present invention provides a display panel decreasing manufacturing costs.

The present invention also provides a display apparatus decreasing a size of a printed circuit board ("PCB") using the display panel.

The present invention also provides a method of decreasing a size of a PCB in the display apparatus.

In exemplary embodiments according to the present invention, the display panel includes a first source-pad portion, a first source fan-out portion and first source lines. The first source-pad portion has a first group of pads to which a driving signal is applied from an external source. The first source fan-out portion has first output lines that are extended from the first group of pads and have an asymmetric structure. The first source lines are extended from the first output lines, and pixels of different colors are connected to each of the first source lines.

The first source fan-out portion may include a first asymmetric portion and a first equivalent resistance portion. The first output lines within the first asymmetric portion may have different lengths from each other, and the first equivalent resistance portion may increase uniformity of line resistance of the first output lines.

Each of the first output lines within the first equivalent resistance portion may have a zigzag pattern having different lengths from each other, or line widths of the first output lines in the first equivalent resistance portion may be different from one another.

The display panel may further include a second source-pad portion having a second group of pads to which the driving signal is applied from the external source, a second source fan-out portion having second output lines that are extended from the second group of pads and have an asymmetric structure with respect to a central line of the second group of the pads, and second source lines extended from the second output lines. The second source fan-out portion may have a symmetric structure with respect to the first source fan-out portion. The pixels of different colors are connected to each of the second source lines.

The second source fan-out portion may include a second asymmetric portion having a symmetric structure with respect to the first asymmetric structure, and a second equivalent resistance portion increasing uniformity of line resistance of the second output lines. The second output lines within the second asymmetric portion have different lengths from each other.

In other exemplary embodiments according to the present invention, the display apparatus includes a display panel, a first source tape carrier package ("TCP") and a PCB. The display panel includes a first group of source lines having a source line to which pixels of different colors are commonly connected, a first source fan-out portion having first output lines connected to the first group of source lines and having an asymmetric structure, and a first source-pad portion formed at an end portion of the first output lines. An output terminal of the first source TCP makes contact with the first source-pad portion. An input terminal of the first source TCP makes contact with a longitudinal edge of the PCB.

In still other exemplary embodiments according to the present invention, a method of decreasing a size of a PCB in a display apparatus includes disposing a plurality of source lines in a first direction on a display panel of the display apparatus, arranging a plurality of pixel units in a matrix configuration, each pixel unit having a plurality of pixels connected to a common source line of the source lines, symmetrically arranging a PCB with respect to a center line of the display panel, disposing a source TCP on the PCB and adjacent to a center line of the PCB, connecting a group of output lines from the source TCP to a subset of the source lines located on one side of the center line of the display panel, the output lines including an asymmetric portion extending from the source TCP and an equivalent resistance portion extending to the subset of source lines, the output lines within the asymmetric portion having different lengths from each other, and the output lines within the equivalent resistance portion increasing uniformity of line resistance of the output lines.

According to the exemplary embodiments of the present invention, when a unit pixel portion having the pixels of different colors is electrically connected to one source line, the source fan-out portion is formed to have the asymmetric structure, so that the size of the PCB may by decreased.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with Reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described with reference to the accompanying drawings.

Figure 1:
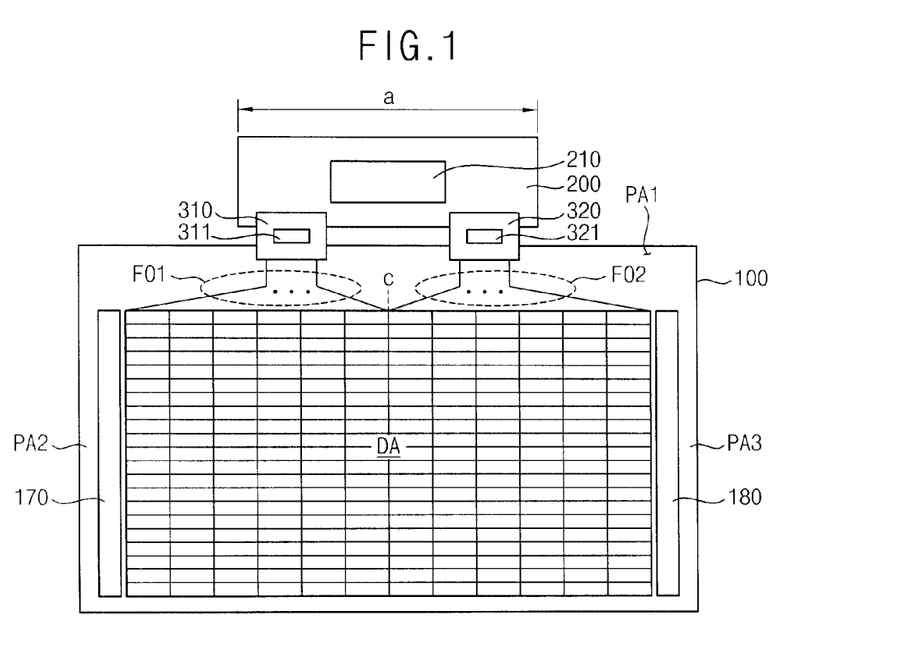
FIG. 1 is a plan view illustrating an exemplary display apparatus according to an exemplary embodiment of the present invention.
Figure 2:
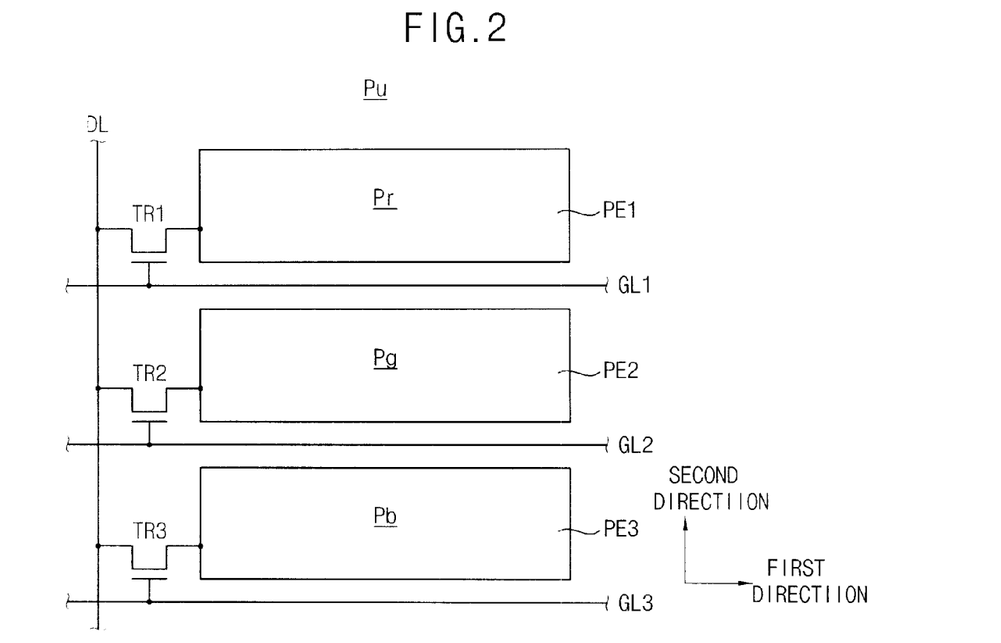
FIG. 2 is an equivalent circuit diagram of a unit pixel portion of the exemplary display panel in FIG. 1.

FIG. 1 is a plan view illustrating an exemplary display apparatus according to an exemplary embodiment of the present invention. FIG. 2 is an equivalent circuit diagram of a unit pixel portion of the exemplary display panel in FIG. 1.

Referring to FIGS. 1 and 2, the display apparatus includes a display panel 100, a printed circuit board ("PCB") 200, and a plurality of data or source tape carrier packages ("TCPs") 310 and 320.

The display panel 100 includes two substrates facing each other, and a liquid crystal layer disposed between the two substrates. The display panel 100 includes a display area DA, and first, second, and third peripheral areas PA1, PA2, and PA3.

The display area DA includes a plurality of pixels defined by gate lines and data (or source) lines extending to cross each other. The first, second, and third peripheral areas PA1, PA2, PA3 surround at least three sides of the display area DA.

The pixels formed in the display area DA are shown in FIG. 2.

Referring to FIG. 2, a unit pixel portion Pu includes pixels of different colors. For example, the unit pixel portion Pu includes a first pixel Pr having a red color, a second pixel Pg having a green color, and a third pixel Pb having a blue color. In alternative embodiments, the unit pixel portion Pu may include first, second, and third pixels having different colors, or the unit pixel portion Pu may include a fourth pixel having a white color.

Each of the first, second, and third pixels Pr, Pg, and Pb has a first edge along a first direction, which is the extending direction of the gate lines, and has a second edge along a second direction substantially perpendicular to the first direction, which is the extending direction of the data lines. The first edge of each pixel is substantially longer than the second edge. The unit pixel portion Pu includes an arrangement along the second direction, such as by having the pixels within each unit pixel portion Pu arranged in a column, in other words, a perpendicular arrangement shape. For example, the first, second and third pixels Pr, Pg and Pb are arranged along the second direction substantially parallel with a source line DL.

Accordingly, the unit pixel portion Pu is driven by one source line DL and three gate lines GL1, GL2 and GL3. For example, the first pixel Pr includes a first switching element TR1 electrically connected to the source line DL and the first gate line GL1, and a first pixel electrode PE1 electrically connected to the first switching element TR1. In the same way, the second pixel Pg includes a second switching element TR2 electrically connected to the source line DL and the second gate line GL2, and a second pixel electrode PE2. The third pixel Pb includes a third switching element TR3 electrically connected to the source line DL and the third gate line GL3, and a third pixel electrode PE3.

The unit pixel portion Pu includes the perpendicular arrangement shape, so that the number of source lines DL is decreased by one third compared with a unit pixel portion including an arrangement along the first direction, in other words, a parallel arrangement shape where the pixels of each pixel unit are arranged in a row direction. Therefore, the display apparatus including the perpendicular arrangement shape may also decrease the number of source driving chips that apply a data signal to the source lines DL by one third.

First and second source pad portions (not shown) electrically connected to the first and second source TCPs 310 and 320, and first and second source fan-out portions FO1 and FO2 corresponding to the first and second source pad portions are formed in the first peripheral area PA1. The first peripheral area PA1 is disposed between the display area DA and the PCB 200.

The first source fan-out portion FO1 is electrically connected to a first group of source lines DL formed in a left side with respect to a central portion or region C of the display panel 100. The second source fan-out portion FO2 is electrically connected to a second group of source lines formed in a right side with respect to the central portion C of the display panel 100. The display area DA may be substantially divided in half with respect to the central portion C, where a first half of the display area DA is closer to the second peripheral area PA2, and the second half of the display area DA is closer to the third peripheral area PA3.

The first source fan-out portion FO1 includes first output lines extended from the first group of source lines DL. The first source fan-out portion FO1 includes a first asymmetric portion and a first equivalent resistance portion. Each of the first output lines also includes a first asymmetric portion and a first equivalent resistance portion. The first asymmetric portion has the first output lines having different lengths. The first equivalent resistance portion increases uniformity of line resistance of the first output lines having different lengths.

The second source fan-out portion FO2 includes second output lines extended from the second group of source lines DL. The second source fan-out portion FO2 includes a second asymmetric portion and a second equivalent resistance portion. Each of the second output lines also includes a second asymmetric portion and a second equivalent resistance portion. The second asymmetric portion has the second output lines having different lengths, and has a symmetric structure with respect to the first asymmetric portion. The second equivalent resistance portion increases uniformity of line resistance of the second output lines having the different lengths.

Lengths of the first output lines formed in the first asymmetric portion adjacent to the second asymmetric portion are shorter than that of the first output lines formed in the first asymmetric portion spaced apart from the second asymmetric portion. In addition, the lengths of the second output lines formed in the second asymmetric portion adjacent to the first asymmetric portion are shorter than that of the second output lines formed in the second asymmetric portion spaced apart from the first asymmetric portion. In other words, the lengths of the first and second output lines in the first and second asymmetric portion increase from the central portion to the portions most closely adjacent the second and third peripheral areas PA2 and PA3. Accordingly, the first and second source pad portions electrically connected to the first and second source fan-out portions FO1 and FO2, respectively, are concentrated towards the central portion C of the display panel 100.

First and second gate driving parts 170 and 180 outputting a gate signal to the gate lines GL, are formed in the second and third peripheral areas PA2 and PA3. The first and second gate driving parts 170 and 180 are respectively mounted through driving chips. Alternatively, driving circuits are integrated so that the first and second gate driving parts 170 and 180 may be formed in the second and third peripheral areas PA2 and PA3. Alternatively, the first and second gate driving parts 170 and 180 may be integrated into one gate driving part in the second peripheral area PA2, or in the third peripheral area PA3.

A main chip 210 is mounted on the PCB 200, and the PCB 200 is electrically connected to the display panel 100 through the first and second source TCPs 310 and 320.

A first source driving chip 311 and a second source driving chip 321 that output a driving signal to the first and second group of source lines DL, are respectively mounted on the first and second source TCPs 310 and 320.

An input terminal of the first source TCP 310 makes contact with the first edge of the PCB 200, and an output terminal thereof makes contact with the first source pad portion of the display panel 100. An input terminal of the second source TCP 320 makes contact with the first edge of the PCB 200, and an output terminal thereof makes contact with the second source pad portion of the display panel 100.

Each of the first and second source fan-out portions FO1 and FO2 has an asymmetric structure, so that the first and second source pad portions are concentrated on the central portion C of the display panel 100. For example, the first and second source pad portions are shifted toward the central portion C of the display panel 100. The first and second source TCPs 310 and 320 are concentratively mounted towards the central portion C, and the length of the first edge 'a' of the PCB 200, on which the first and second source TCPs 310 and 320 are mounted, is decreased. The first edge 'a' of the PCB 200 is defined as the edge extending along the first direction, such as a direction parallel to an extending direction of the gate lines GL. Thus, a size of the PCB 200 may be decreased.

Therefore, the pixel structure of the display panel 100 is the perpendicular arrangement shape, so that the number of the first and second source TCPs 310 and 320 is decreased by one third and the size of the PCB 200 is firstly decreased. In addition, the first and second source fan-out portions FO1 and FO2 have the asymmetric structure allowing the first and second source TCPs 310 and 320 to be concentrated towards the central portion C, so that the size of the PCB 200 is secondly decreased.

Figure 3:
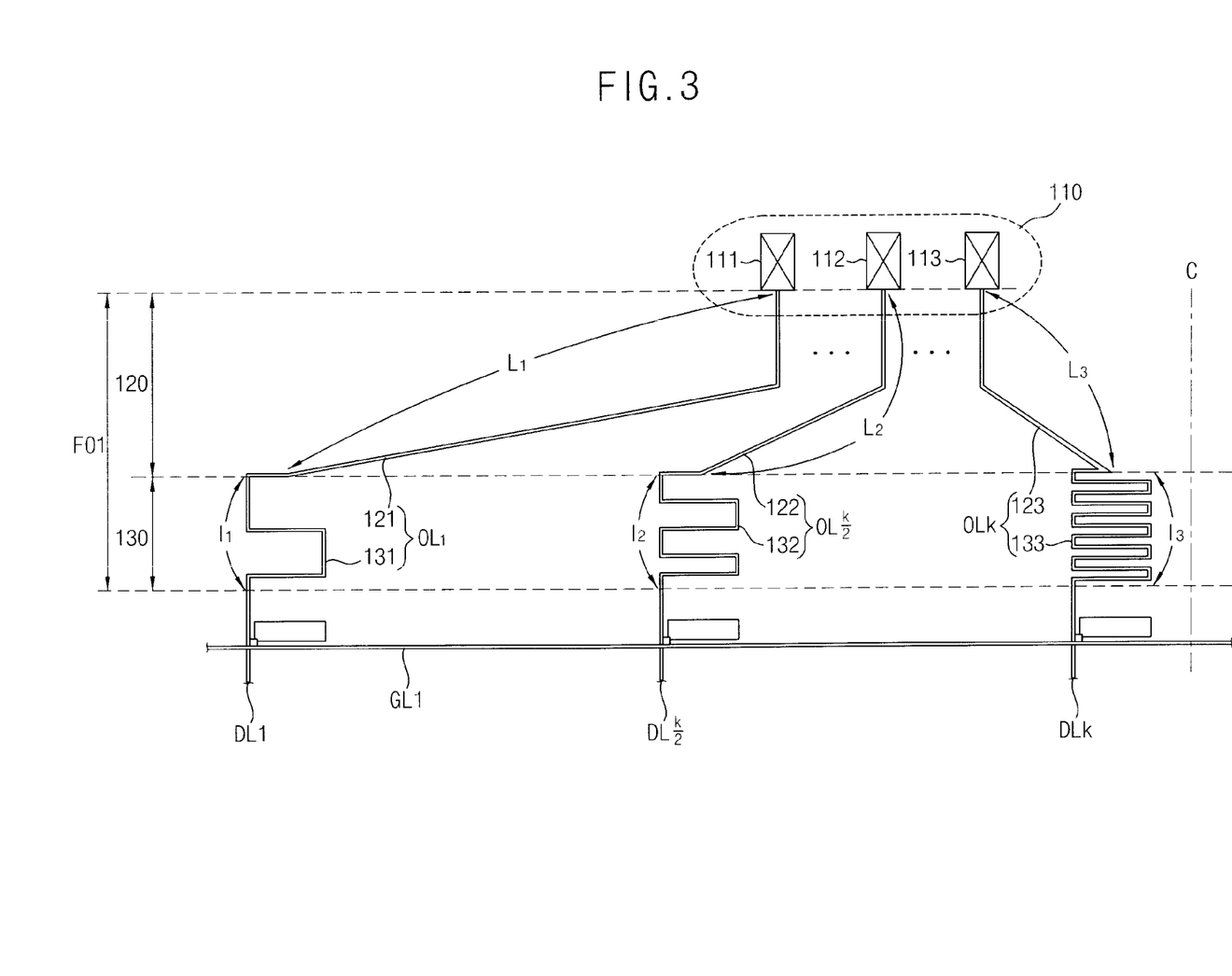
FIG. 3 is a plan view illustrating a portion of the exemplary display panel in FIG. 1 according to an exemplary embodiment of the present invention.

FIG. 3 is a plan view illustrating a portion of the exemplary display panel in FIG. 1 according to an exemplary embodiment of the present invention.

Referring to FIGS. 1 and 3, the first source fan-out portion FO1 includes the first asymmetric portion 120 extended from the first source pad portion 110, and the first equivalent resistance portion 130 formed between the first asymmetric portion 120 and the display area DA.

For example, the first source pad portion 110 includes a k number of pads 111, 112 and 113. The k pads 111, 112 and 113 output the driving signal to the source lines DL1, ..., DLk that make contact with the output terminals of the first source TCP 310, which are grouped. The first source fan-out portion FO1 includes k output lines OL1, ..., OLk/2, ..., OLk electrically connecting the k pads 111, 112 and 113 to the source lines DL1, ..., DLk.

The first asymmetric portion 120 of the first source fan-out portion FO1 extends from the first source pad portion 110, and has the asymmetric structure. The equivalent resistance portion 130 compensates a line resistance difference due to the asymmetric structure of the asymmetric portion 120, so as to equalize the line resistance of the output lines OL1, ..., OLk/2, ..., OLk of the first source fan-out portion FO1.

For example, the first output line OL1 includes a first asymmetric portion 121, having a length L1, extended from the first pad 111, and a first equivalent resistance portion 131, having a first length $l_1$, connecting the first asymmetric portion 121 to the first source line DL1.

The k/2-th output line OLk/2 includes a second asymmetric portion 122, having a length L2, extended from the k/2-th pad 112 and being shorter than the first asymmetric portion 121, and a second equivalent resistance portion 132, having a second length $l_2$, connecting the second asymmetric portion 122 to the k/2-th source line DLk/2, and being longer than the first equivalent resistance portion 131.

The k-th output line OLk includes a third asymmetric portion 123, having a length L3, extended from the k-th pad 113 and being shorter than the second asymmetric portion 122, and a third equivalent resistance portion 133, having a third length $l_3$, connecting the third asymmetric portion 123 to the k-th source line DLk and being longer than the second equivalent resistance portion 132.

The first, second and third lengths L1, L2 and L3 of the first, second and third asymmetric portions 121, 122 and 123 substantially meet L1>L2>L3, and the first, second and third lengths $l_1$, $l_2$ and $l_3$ of the first, second and third equivalent resistance portions 131, 132 and 133 substantially meet $l_1 < l_2 < l_3$. The line lengths of the output lines OL1, OLk/2 and OLk are substantially the same as one another. In other words, L1+$l_1$ is substantially the same as L2+$l_2$ which is substantially the same as L3+$l_3$.

Accordingly, the k output lines OL1, ..., OLk are formed to have substantially the same length as each other, for example substantially the same line resistance. In this case, line widths of the output lines OL1, ..., OLk are assumed to be substantially the same.

Figure 4:
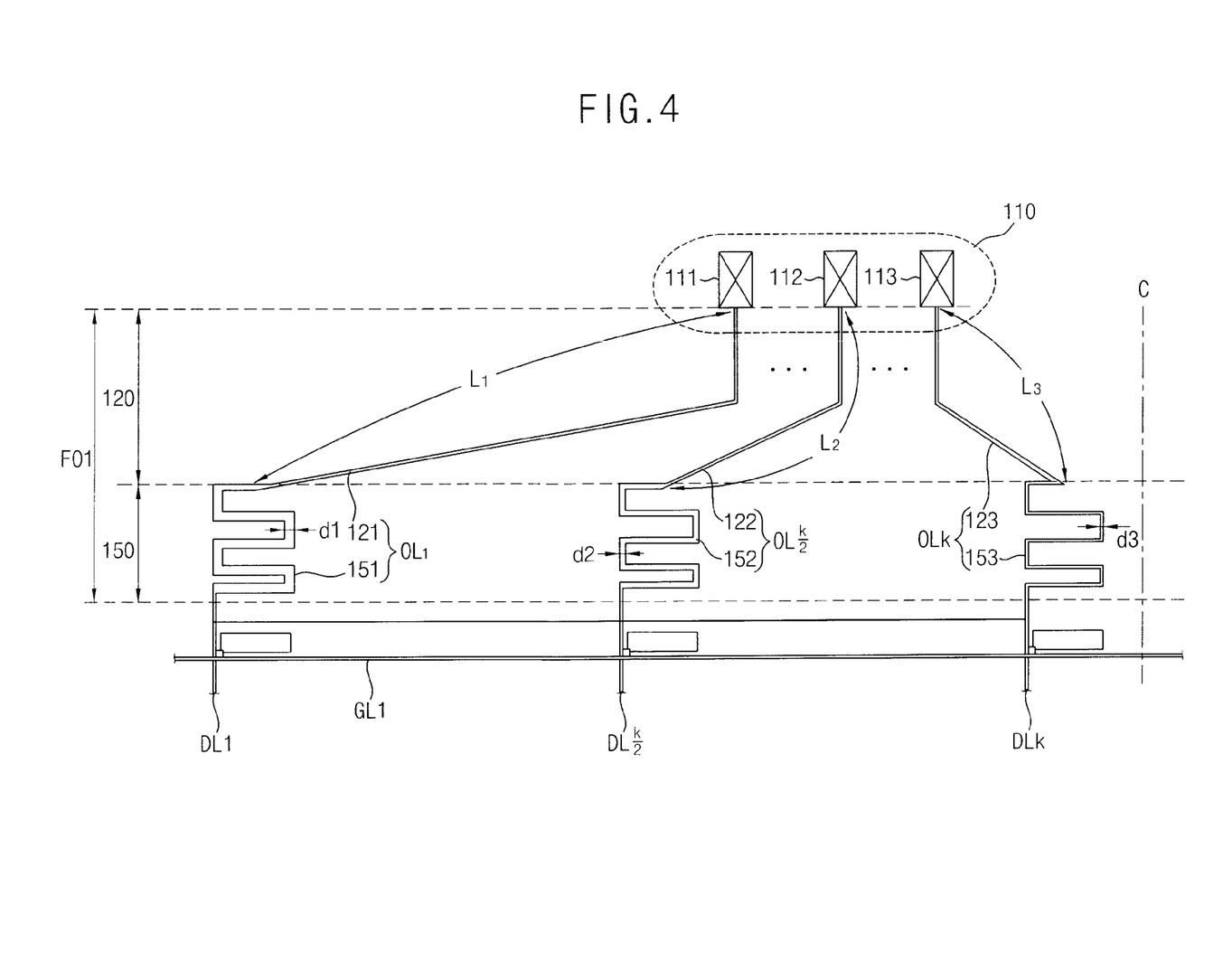
FIG. 4 is a plan view illustrating a portion of the exemplary display panel in FIG. 1 according to another exemplary embodiment of the present invention.

FIG. 4 is a plan view illustrating a portion of the exemplary display panel in FIG. 1 according to another exemplary embodiment of the present invention.

Referring to FIGS. 1 and 4, the first source fan-out portion FO1 includes the asymmetric portion 120 extended from the source pad portion 110, and an equivalent resistance portion 150 formed between the asymmetric portion 120 and the display area DA. In the first exemplary embodiment as illustrated in FIG. 3, the line length of the equivalent resistance portion 130 is controlled to form the equivalent resistance. However, in the exemplary embodiment as illustrated in FIG. 4, the line width of the equivalent resistance portion 150 is controlled to form the equivalent resistance.

For example, the first asymmetric portion 120 of the first source fan-out portion FO1 is formed to be asymmetric as described above. The line lengths of the first equivalent resistance portion 150 of the first source fan-out portion FO1 are substantially the same as one another, but the line widths thereof are different from one another.

Generally, the line resistance is in proportion to the line length and is in inverse proportion to the line width. Thus, the line width d1 of the first equivalent resistance portion 151 connected to the first asymmetric portion 121 having a relatively longer line length than the second and third asymmetric portions 122, 123, is formed to be relatively larger than the line widths d2, d3 of the second and third equivalent resistance portions 152, 153. The line width d3 of the third equivalent resistance portion 153 connected to the third asymmetric portion 123 having a relatively shorter line length than the first and second asymmetric portions 121, 122, is formed to be relatively narrower than the line widths d1, d2 of the first and second equivalent resistance portions 151, 152. For example, the first, second and third lengths L1, L2 and L3 of the first, second and third asymmetric portions 121, 122 and 123 substantially meet L1>L2>L3, and the first, second and third line widths d1, d2 and d3 of the first, second and third equivalent resistance portions 151, 152 and 153 substantially meet d1>d2>d3.

Accordingly, the line resistance of the first equivalent resistance portion 151 connected to the first asymmetric portion 121 having the relatively larger line resistance, is formed to be relatively smaller than the second and third equivalent resistance portions 152, 153. The line resistance of the third equivalent resistance portion 153 connected to the third asymmetric portion 123 having the relatively smaller line resistance, is formed to be relatively larger than the first and second equivalent resistance portions 151, 152.

The line resistance difference due to the length difference of the first, second and third asymmetric portions 121, 122 and 123 is compensated by the line resistance difference due to the width difference of the first, second and third equivalent resistance portions 151, 152 and 153, so that the line resistances of the k output lines OL1, ..., OLk/2, ..., OLk are formed to be substantially the same as one another.

The second source fan-out portion FO2 is not shown in FIGS. 3 and 4, but the second source fan-out portion FO2 has a symmetric structure with the first source fan-out portion FO1 with respect to the central portion C of the display panel 100. In other words, the second source fan-out portion FO2 may be substantially a mirror image of the first source fan-out portion FO1.

Also, while FIG. 3 illustrates an embodiment where changes in line lengths within the equivalent resistance portions 131, 132, and 133 are used to compensate for the line resistance difference of the asymmetric portions 121, 122, and 123, and while FIG. 4 illustrates an embodiment where changes in line widths within the equivalent resistance portions 151, 152, and 153 are used to compensate for the line resistance difference of the asymmetric portions 121, 122, and 123, it should be understood that a combination of changes in line lengths and line widths may be used within an equivalent resistance portion of the source fan-out portions, so long as the line resistances of the output lines OL1, ..., OLk are formed to be substantially the same as one another.

Figure 5:
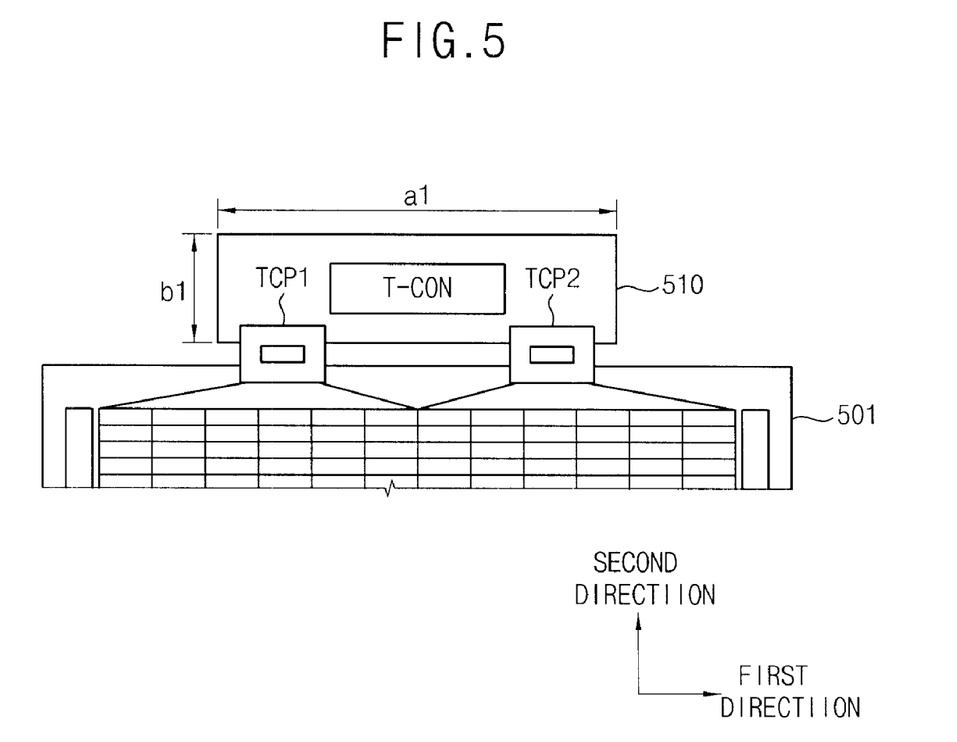
FIG. 5 is a plan view illustrating the exemplary display apparatus according to the exemplary embodiments of the present invention.

FIG. 5 is plan view illustrating the exemplary display apparatus according to the exemplary embodiments of the present invention. FIG. 5 illustrates the exemplary display apparatus having the perpendicular arrangement shape and the exemplary fan-out portion having the asymmetric structure according to the exemplary embodiment of the present invention.

Table 1 shows results measuring the length of the first and second edges of the PCB 510 in the exemplary embodiment of the present invention.

TABLE 1

|  | Length [mm] | |
| --- | --- | --- |
|  | Length of the first edge | Length of the second edge |
| Example Embodiment | a1 = 150 | b1 = 52.4 |

Referring to FIG. 5 and Table 1, the PCB 510, used in the exemplary embodiment of the present invention, is attached to the display panel 501 having the perpendicular arrangement shape of pixels within a pixel unit and the fan-out portion having the asymmetric structure, so that the number of TCPs in the exemplary embodiment of the present invention is decreased. For example, two TCPs TCP1 and TCP2 are mounted on the PCB 510. In addition, the two TCPs TCP1 and TCP2 are concentratively mounted towards the central portion of the display panel 501, so that the size of the PCB 510 may be further decreased.

Thus, in the exemplary embodiment of the present invention, the length of the first edge a1 that is the relatively longer edge of the PCB 510 is about 150 mm and the length of the second edge b1 that is the relatively shorter edge of the PCB 510 is about 52.4 mm. The size of the PCB 510 in the exemplary embodiment of the present invention is thus decreased.

According to the present invention, the perpendicular arrangement shape of the unit pixel portion and the asymmetric structure of the fan-out portion are formed so that the size of the PCB may be remarkably decreased. Thus, costs for manufacturing the display apparatus may be decreased.

Having described exemplary embodiments of the present invention and their advantages, it is noted that various changes, substitutions and alterations can be made herein without departing from the spirit and scope of the invention as defined by appended claims.

What is claimed is:

1. A display panel comprising:
 a source-pad portion having a group of pads electrically connected commonly to a driving chip;
 a source fan-out portion having output lines that are extended from the group of pads, wherein the output lines are electrically connected commonly to the driving chip, and asymmetrically disposed with respect to a first vertical line passing through a center of the driving chip and extending in a first direction so that a first outermost output line has a length different from a length of a second outermost output line disposed opposite to the first outermost output line; and
 a plurality of source lines electrically connected to the output lines and extending in the first direction.

2. The display panel of claim 1, further comprising gate lines connected to pixels of different colors.

3. The display panel of claim 1, wherein the source fan-out portion comprises:
 an asymmetric portion, each of the output lines within the asymmetric portion extending straightly; and
 an equivalent resistance portion, each of the output lines within the equivalent resistance portion including a plurality of zigzag patterns connected to each other, and
 wherein the number of the zigzag patterns of the output lines in the equivalent resistance portion are different from each other.

4. The display panel of claim 3, wherein the output lines in the equivalent resistance portion have a substantially same width in the first direction.

5. The display panel of claim 3, wherein a zigzag pattern of a first output line has a size different from a zigzag pattern of a second output line adjacent to the first output line.

6. The display panel of claim 3, wherein a gap between adjacent zigzag patterns of a first output line is greater than a gap between adjacent zigzag patterns of a second output line adjacent to the first output line.

7. The display panel of claim 3, wherein the number of the zigzag patterns of a first output line is smaller than the number of the zigzag patterns of a second output line adjacent to the first output line when the first output line has a greater length than the second output line in the asymmetric portion.

8. The display panel of claim 1, wherein the first vertical line is closer to a central line of the display panel than a second vertical line, which is parallel to the source lines, and disposed between a first outermost source line and a second outermost source line disposed opposite to the first outermost source line to be spaced apart from the first and second outermost source lines by a same distance, the central line of the display panel being parallel to the source lines.

9. A display apparatus comprising:
 a display panel including a first group of source lines, a source fan-out portion having output lines connected to the first group of source lines, and a source-pad portion formed at an end portion of the output lines;
 a source tape carrier package, wherein the output lines are electrically connected commonly to the source tape carrier package, and asymmetrically disposed with respect to a first vertical line passing through a center of the first source tape carrier package and extending in a first direction so that a first outermost output line has a length different from a length of a second outermost output line disposed opposite to the first outermost output line; and
 a printed circuit board, a longitudinal edge of which making contact with an input terminal of the first source tape carrier package,
 wherein an axis defining the asymmetric structure of the output lines is substantially parallel to the source lines.

10. The display panel of claim 9, wherein the source fan-out portion comprises:
 an asymmetric portion, each of the output lines within the asymmetric portion extending straightly; and
 an equivalent resistance portion, each of the output lines in the equivalent resistance portion including a plurality of zigzag patterns connected to each other, and
 wherein the number of the zigzag patterns of the output lines in the equivalent resistance portion are different from each other.

11. The display panel of claim 10, wherein the output lines in the equivalent resistance portion have a substantially same width in the first direction.

12. The display panel of claim 10, wherein a zigzag pattern of a first output line has a size different from a zigzag pattern of a second output line adjacent to the first output line.

13. The display panel of claim 10, wherein a gap between adjacent zigzag patterns of a first output line is greater than a gap between adjacent zigzag patterns of a second output line adjacent to the first output line.

14. The display panel of claim 10, wherein the number of the zigzag patterns of a first output line is smaller than the number of the zigzag patterns of a second output line adjacent to the first output line when the first output line has a greater length than the second output line in the asymmetric portion.

15. The display panel of claim 9, wherein the first vertical line is closer to a central line of the display panel than a second vertical line, which is parallel to the source lines, and disposed between a first outermost source line and a second outermost source line disposed opposite to the first outermost source line to be spaced apart from the first and second outermost source lines by a same distance, the central line of the display panel being parallel to the source lines.

16. The display apparatus of claim 9, wherein the first source tape carrier package is connected to an outmost edge of the display panel.

17. A method of decreasing a size of a printed circuit board in a display apparatus, the method comprising;
   disposing a plurality of source lines in a first direction on a display panel of the display apparatus;
   arranging a plurality of pixel units in a matrix configuration, each pixel unit having a plurality of pixels connected to a common source line of the source lines;
   symmetrically arranging a printed circuit board with respect to a center line of the display panel;
   disposing a source tape carrier package on the printed circuit board and adjacent to a center line of the printed circuit board;
   connecting a group of output lines from the source tape carrier package to a subset of the source lines located on one side of the center line of the display panel so that the output lines are asymmetrically disposed with respect to a first vertical line passing through a center of the source tape carrier package and extending in a first direction so that a first outermost output line has a length different from a length of a second outermost output line disposed opposite to the first outermost output line and have an equivalent resistance portion extending to the subset of source lines.

18. The method of claim 17, wherein the source fan-out portion comprises:
   an asymmetric portion, each of the output lines within the asymmetric portion extending straightly; and
   an equivalent resistance portion, each of the output lines in the equivalent resistance portion including a plurality of zigzag patterns connected to each other, and
   wherein the number of the zigzag patterns of the output lines in the equivalent resistance portion are different from each other.

19. The method of claim 18, wherein the output lines in the equivalent resistance portion have a substantially same width in the first direction.

20. The method of claim 18, wherein a zigzag pattern of a first output line has a size different from a zigzag pattern of a second output line adjacent to the first output line.

* * * * *